C. B. GRAY.
MACHINE FOR CUTTING SHEET FORM MATERIAL.
APPLICATION FILED OCT. 26, 1917.

1,313,481.

Patented Aug. 19, 1919.
6 SHEETS—SHEET 1.

Inventor
Charles B. Gray
By Cyrus Kehr
Attorney

C. B. GRAY.
MACHINE FOR CUTTING SHEET FORM MATERIAL.
APPLICATION FILED OCT. 26, 1917.

1,313,481.

Patented Aug. 19, 1919.
6 SHEETS—SHEET 2.

Inventor
Charles B. Gray
By Cyrus Kehr
Attorney

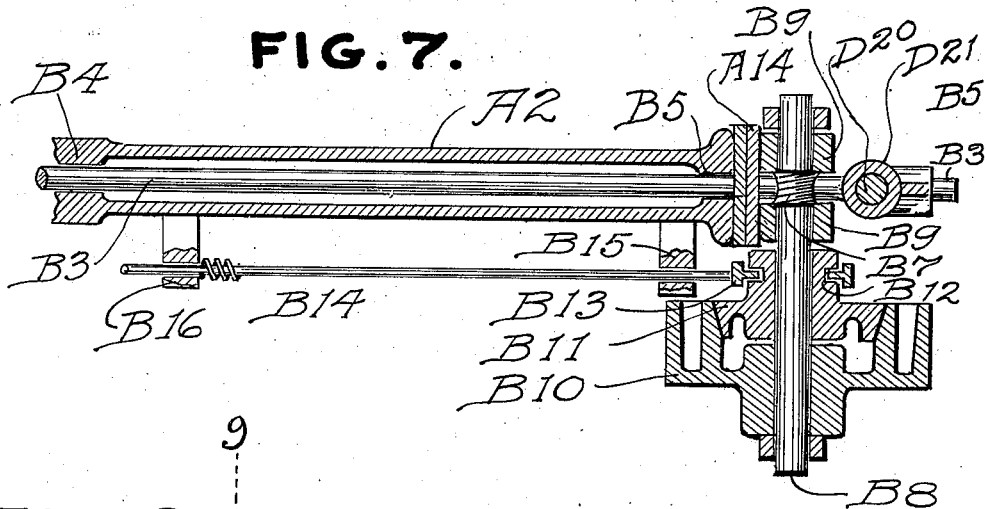
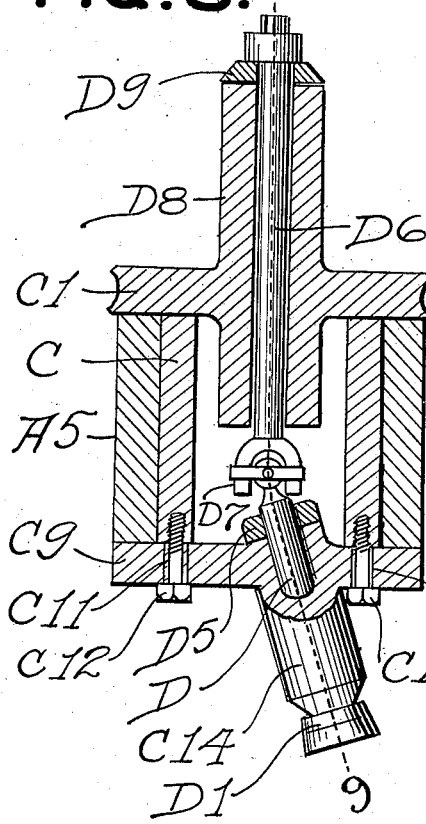
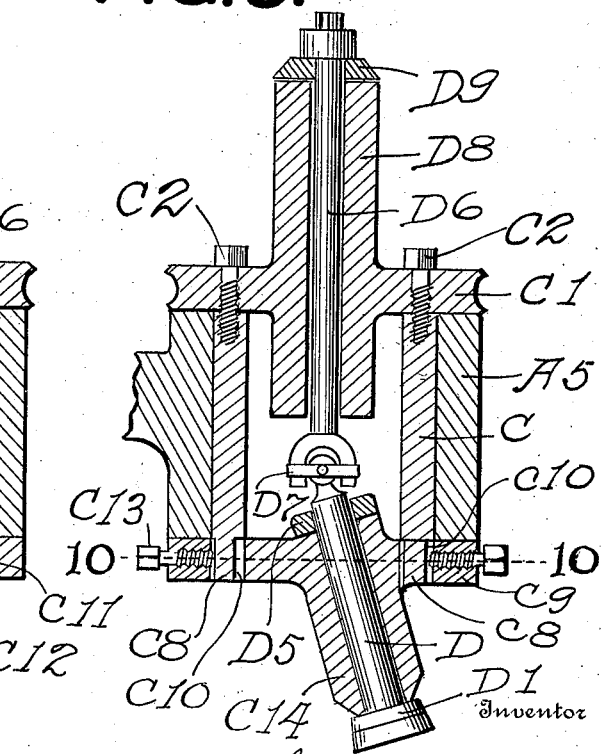

C. B. GRAY.
MACHINE FOR CUTTING SHEET FORM MATERIAL.
APPLICATION FILED OCT. 26, 1917.

1,313,481.

Patented Aug. 19, 1919.
6 SHEETS—SHEET 6.

UNITED STATES PATENT OFFICE.

CHARLES B. GRAY, OF KNOXVILLE, TENNESSEE.

MACHINE FOR CUTTING SHEET-FORM MATERIAL.

1,313,481.  Specification of Letters Patent.  Patented Aug. 19, 1919.

Application filed October 26, 1917. Serial No. 198,657.

*To all whom it may concern:*

Be it known that I, CHARLES BAXTER GRAY, a citizen of the United States, residing at Knoxville, in the county of Knox and State of Tennessee, have invented a new and useful Improvement in Machines for Cutting Sheet-Form Material, of which the following is a specification, reference being had to the accompanying drawing.

My improvement relates particularly to machines for cutting sheet-form material on lines which do not continue in the same direction. The object of the improvement is to provide a machine for rapidly cutting sheets of metal along lines which are curved or angular or change course so frequently as to prevent the use of ordinary shearing machines.

The machine resembles what are now known in the market as rotary shears.

In my improved machine, provision is made for changing the direction of the cut at the will of the operator without turning the sheet horizontally around the point at which the shearing is being done. When the direction of cutting and the direction of feed have been thus changed, the sheet is still free to be turned manually for changing the direction of the cut on the sheet. The course of the cutting may also be varied by simultaneously changing the direction of the feed and turning the sheet manually with the shearing point as an axis. The change in the direction of the feed is to be used when the sheet is so wide or so long as to make it cumbersome for handling or as to prevent its turning through the throat formed between the upper and lower arms of the machines.

In the accompanying drawings,

Fig. 5 is an enlarged upright section on the line, 5—5, of Fig. 1;

Fig. 6 is a horizontal section on the line, 6—6, of Figs. 1 and 5;

Fig. 7 is a horizontal section on the line, 7—7, of Fig. 1, portions being omitted;

Fig. 8 is an enlarged upright section on the line, 8—8, of Fig. 1, looking toward the right;

Fig. 9 is an upright section on the line, 9—9, of Fig. 8;

Fig. 10 is an enlarged horizontal section on the line, 10—10, of Figs. 1 and 9;

Figure 1:
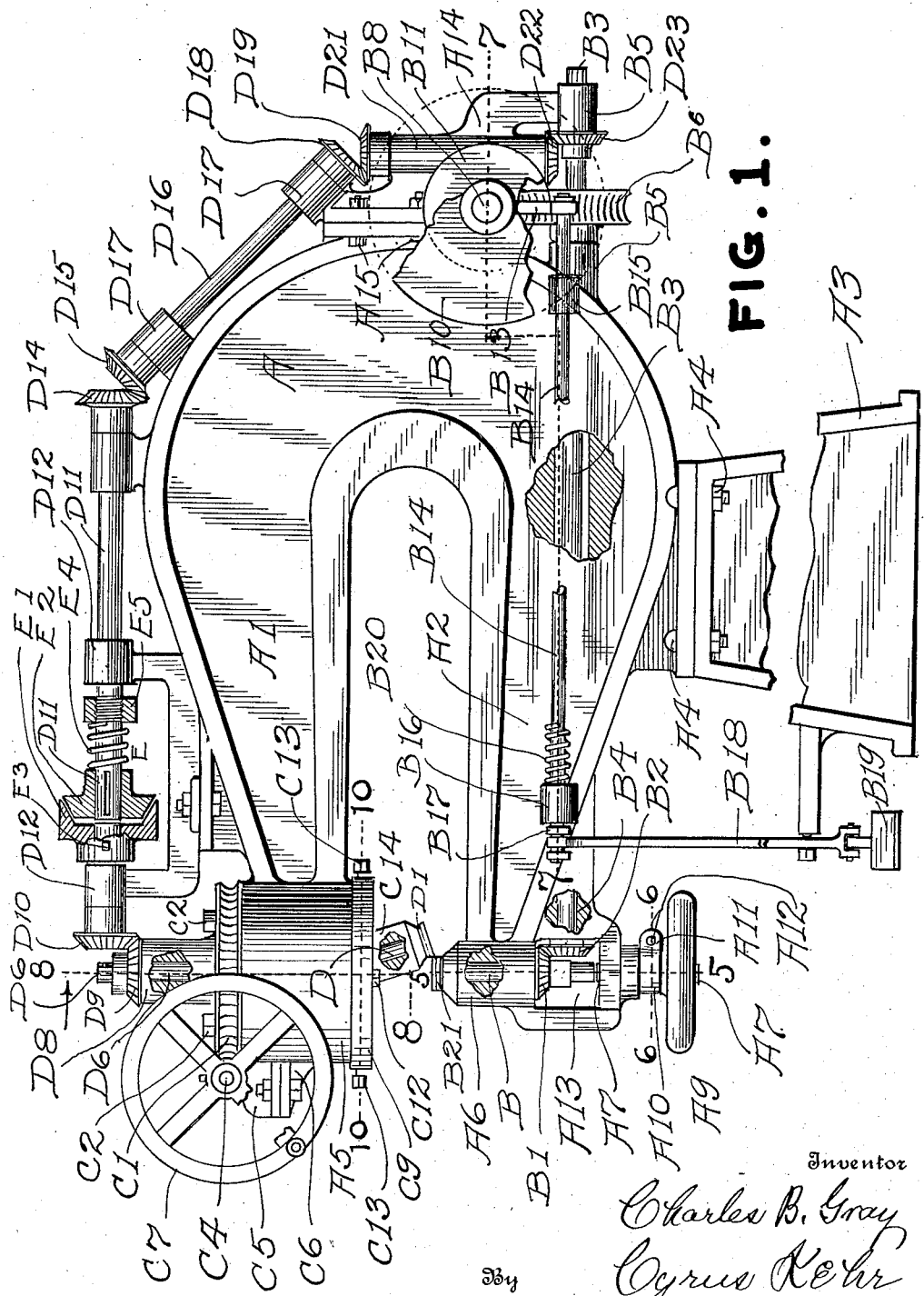
Figure 1 is a front elevation of a machine embodying my improvement, portions being broken away.
Figure 2:
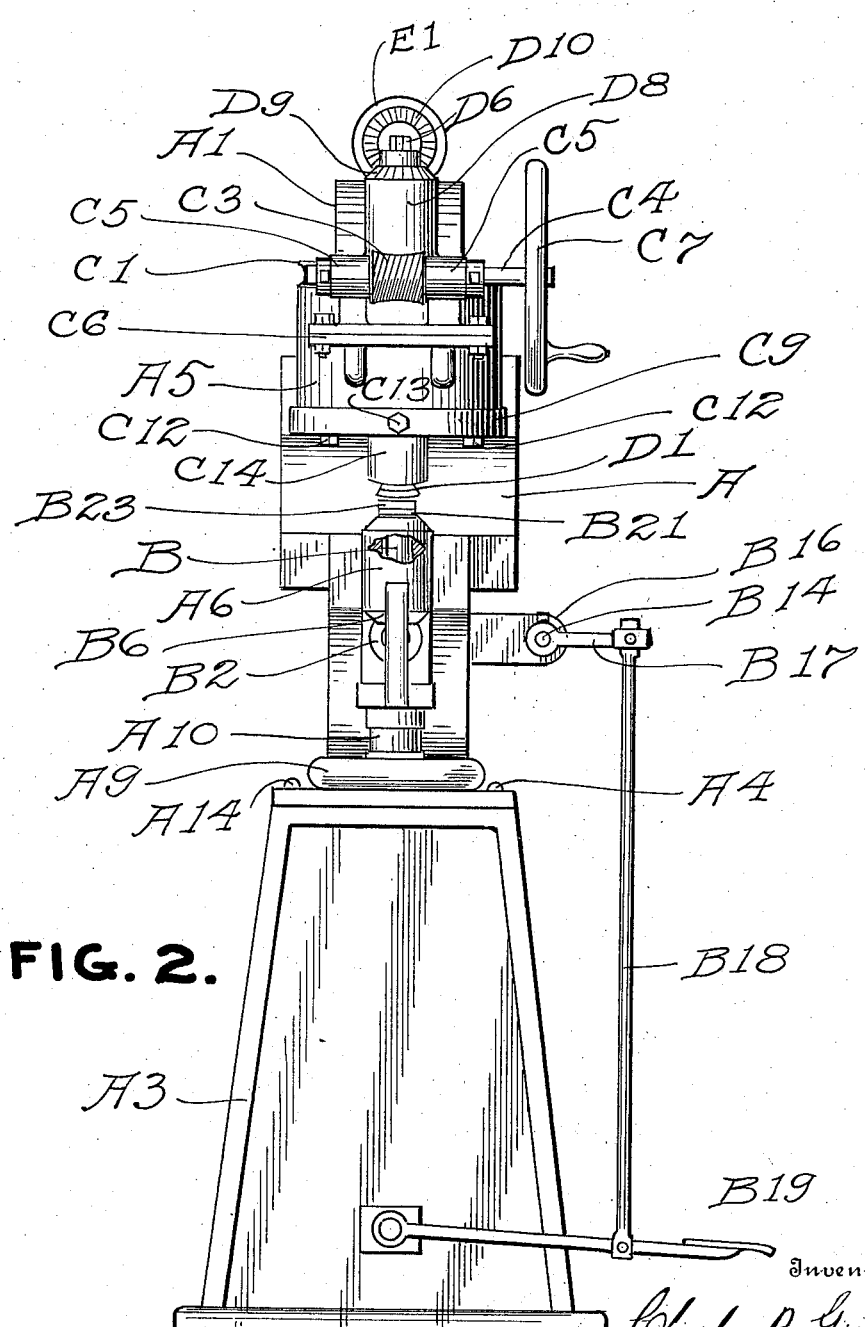
Fig. 2 is an elevation looking toward the right in Fig. 1.
Figure 3:
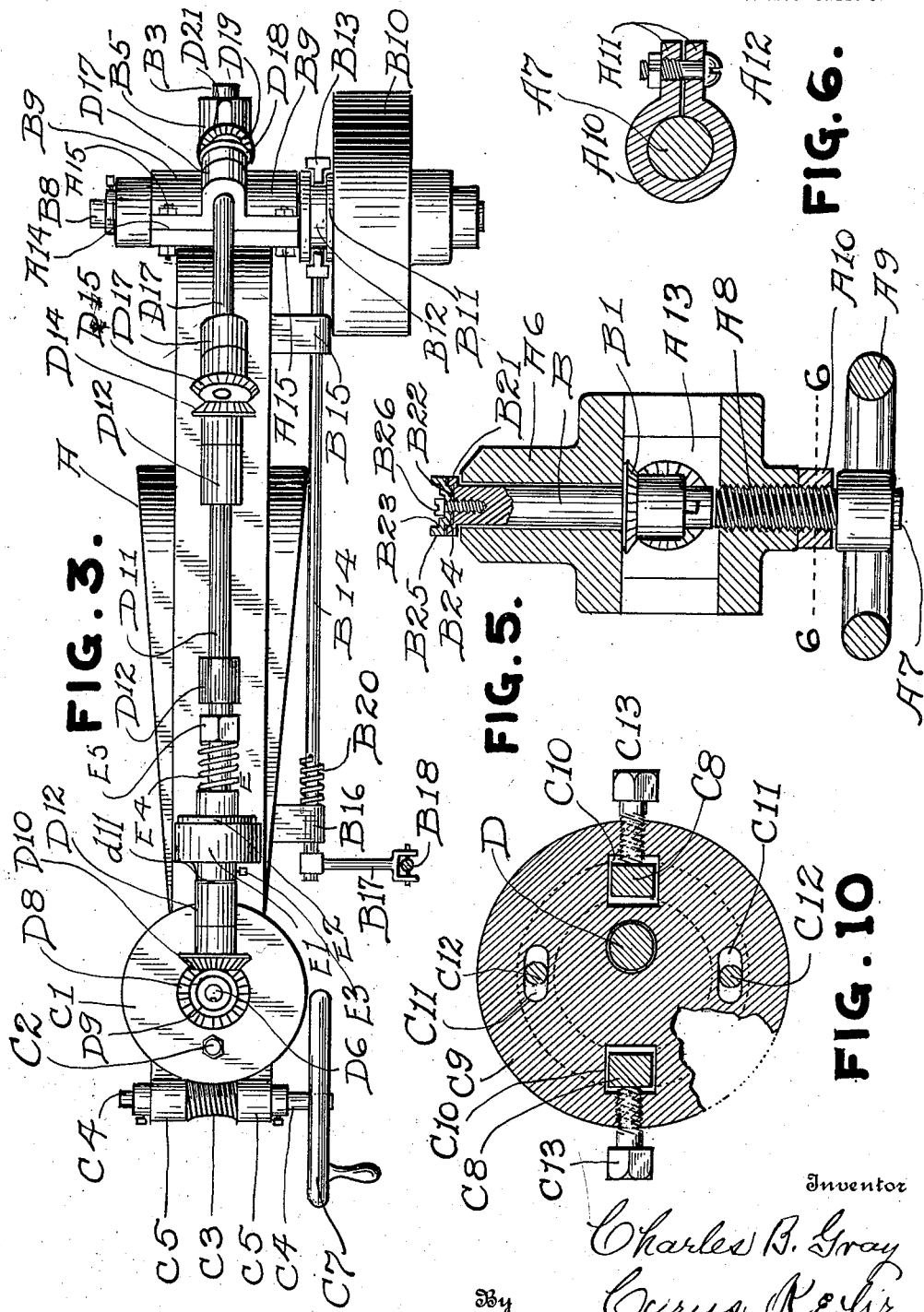
Fig. 3 is a plan of the machine shown in Fig. 1.
Figure 4:
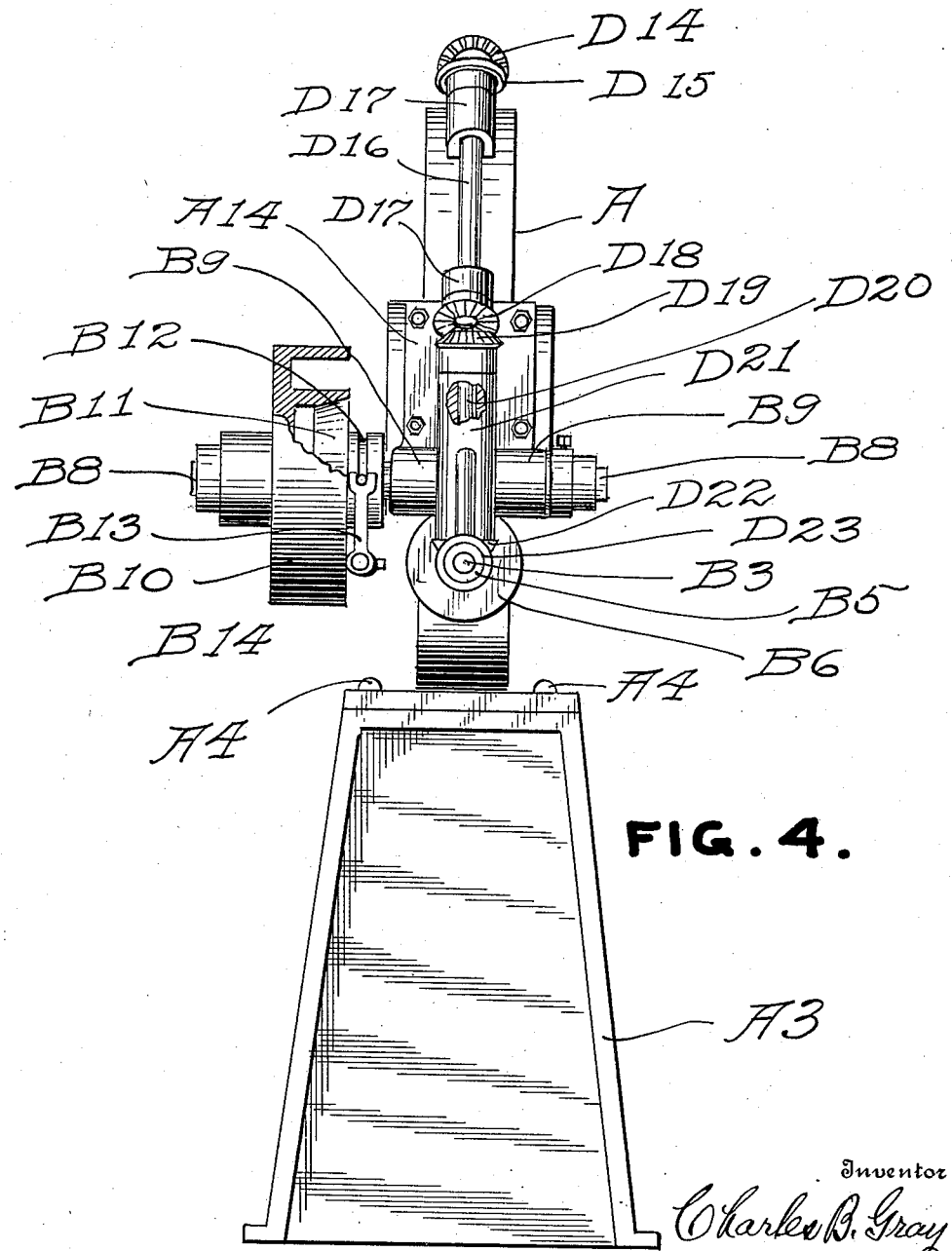
Fig. 4 is an end elevation looking at the machine toward the left in Figs. 1 and 3.

For convenience in description, it is to be understood that the face of the machine shown in Fig. 1 is the front of the machine and "forward" is from the rear of the machine toward the front, and that "backward" is in the opposite direction.

Referring to said drawings, A is the body of the machine having the upper arm, $A^1$, and the lower arm, $A^2$, approximately parallel to the arm, $A^1$. Between said arms is the throat. The body, A, is supported on a base, $A^3$, secured to the body by bolts, $A^4$. On the outer end of the upper arm is an upright bearing, $A^5$. On the outer end of the lower arm is a bearing, $A^6$, in axial alinement with the bearing, $A^5$. Below the bearing, $A^6$, is a chamber, $A^{13}$.

In the bearing, $A^6$, is an upright rotary shaft, B, which extends upward even with the upper end of the bearing, $A^6$, and downward into the chamber, $A^{13}$, to the upper end of the screw shaft, $A^7$, which extends upward through the threaded aperture, $A^8$, formed in the arm, $A^2$, in axial alinement with the shaft, B. On the lower end of the screw shaft is a hand wheel, $A^9$. Above the hand wheel, the screw shaft is surrounded by a split nut, $A^{10}$. At opposite sides of the cut, the nut has ears, $A^{11}$. A screw, $A^{12}$, extends transversely and horizontally through said ears for drawing the latter together to bind said nut upon said shaft so firmly as to prevent the turning of the nut during the operation of the machine. By adjusting the height of the nut, $A^{10}$, on the screw shaft, $A^7$, the height to which said shaft may be raised is varied.

Within said chamber, $A^{13}$, a bevel gear wheel, $B^1$, surrounds said shaft and is secured thereon so as to permit endwise movement of said shaft while the gear wheel, $B^1$, rests upon the bevel gear, $B^2$, which is keyed on the horizontal drive shaft, $B^3$, which extends through the lower arm, $A^2$, and is supported in a bearing, $B^4$, adjacent the bevel wheel, $B^2$, and in bearings, $B^5$, at the right hand portion of the body, A. Between said bearings said shaft is surrounded by and keyed to a worm gear wheel, $B^6$, which meshes with a horizontal worm, $B^7$, having its shaft, $B^8$, resting in bearings, $B^9$. On said shaft is a loose pulley, $B^{10}$, the interior of which forms one member of a conical clutch. The other member, $B^{11}$, of said clutch surrounds said shaft and is feathered thereon to permit sliding endwise and to compel rotation with said shaft. On said member is an annular groove, $B^{12}$. A clutch arm, $B^{13}$, engages in said groove and is supported rigidly on the rock shaft, $B^{14}$. Said shaft rests in bearings, $B^{15}$ and $B^{16}$. At its left hand end, said shaft supports a horizontal arm, $B^{17}$, to which is coupled an upright pedal rod, $B^{18}$, the lower end of which is coupled to a pedal, $B^{19}$. A torsion spring, $B^{20}$, is attached by one end to the shaft, $B^{14}$, and by its other end to the bearing, $B^{16}$, to turn said shaft for disengaging the clutch when the pedal, $B^{19}$, is released. These parts are arranged for the engagement of the clutch by the depression of the pedal.

On the upper end of said shaft, B, and in axial alinement therewith is a disk-form head, $B^{21}$, which is integral with or firmly attached to said shaft. In the upper face of said head is an annular recess, $B^{22}$. The lower shear wheel, $B^{23}$, has an annular boss or downward extension, $B^{24}$, which fits into the recess, $B^{22}$. Along the periphery of said wheel is an upright annular flange, $B^{25}$, the upper face of which is approximately horizontal and roughened to facilitate engagement with the lower face of a piece of sheet metal which is to be sheared. A screw bolt, $B^{26}$, extends downward through said wheel into the shaft, B, and firmly binds said shearing wheel to the head, $B^{21}$. Said head and said shearing wheel are preferably made of the same diameter, as shown by the drawing.

The shearing wheel, $B^{23}$, works in conjunction with the upper shearing wheel, which will be described further on.

In the upper bearing, $A^5$, is a tubular, journal-form turret body, C, having its upper end even with the upper end of said bearing. Across the upper end of said body is placed a worm gear wheel, $C^1$, concentric with the axis of the turret body and secured to the latter by means of cap screws, $C^2$, extending through the worm wheel into the wall of the turret body. The worm wheel rests flatwise upon the upper end of the bearing, $A^5$, and thus holds the turret body against downward movement within said bearing. At the left of said worm wheel is a worm, $C^3$, on a shaft, $C^4$, resting in bearings, $C^5$, which are supported on a bracket, $C^6$, formed on the left hand portion of the bearing, $A^5$. On the front end of the worm shaft, $C^4$, is a hand wheel, $C^7$, by means of which the operator may rotate the worm shaft. The rotation of said shaft involves the rotation of the worm wheel, $C^1$, and the turret body, C. These parts are so proportioned as to cause a given movement of the hand wheel to impart a much smaller movement to the turret body.

Diametrically opposite each other and extending below the bearing, $A^5$, lugs, $C^8$, are formed on the lower end of the turret body. A base plate, $C^9$, extends across the lower end of the bearing, $A^5$, and the lower end of the turret body and has apertures, $C^{10}$, which receive the lugs, $C^8$. Below the wall of the turret body and at opposite sides of the turret axis and midway between the apertures, $C^8$, slots, $C^{11}$, extend through the base plate. A cap screw, $C^{12}$, extends through each of said slots into the adjacent portion of the wall of the turret body. By means of said cap screw the base plate is bound to the turret body. Opposite each aperture, $C^{10}$, a set bolt, $C^{13}$, extends horizontally through the edge of the base plate into the adjacent aperture, $C^{10}$, in position to bear against the adjacent stud, $C^8$. When the cap screws, $C^{12}$, have been loosened, the base plate may be shifted horizontally parallel to the line of the set bolts, $C^{13}$, by retracting one of said bolts and driving the other forward. After such shifting, the plate is again secured by a tightening of the bolt, $C^{12}$.

On the base plate and integral therewith is formed the obliquely downward-directed bearing or barrel, $C^{14}$, in which rests a shaft or journal, D. On the lower end of said shaft, is a disk-form head, $D^1$, which is integral with or firmly attached to said shaft. In the lower end of said head is an annular recess, $D^2$, which receives a boss, $d^2$, on the upper shearing wheel, $D^3$. Said wheel has a downward-directed flange, $d^4$, which meets the upward-directed flange, $B^{25}$, of the lower shearing wheel, $B^{23}$. A binding bolt, $D^4$, extends upward through the wheel, $D^3$, into the head, $D^1$, and the shaft, D, to bind said wheel firmly to said head. Said wheel is preferably made frusto-conical, as shown by the drawing.

Both shearing wheels are preferably made separately from their heads as shown, in order that said wheels may be tempered separately and in order that one wheel may be substituted for another without also substituting the adjacent head and shaft.

The upper end of the shaft, D, extends above the bearing, $C^{14}$. Immediately above said bearing, said shaft is surrounded by a collar, $D^5$, which is fixed on said shaft and holds the latter against downward movement through the barrel, $C^{14}$. Integral with the worm wheel, $C^1$, and bored in axial alinement with the turret is a bearing, $D^8$, in which rests the shaft, $D^6$, the lower end of which is joined to the shaft, D, by means of a universal coupling, $D^7$. Said shaft extends above said bearing and is there surrounded by a bevel gear wheel, $D^9$. Said wheel is feathered on the shaft, $D^6$, so as to permit endwise sliding of said shaft but to compel said shaft and said wheel to rotate in unison. Said wheel meshes with a bevel gear wheel, $D^{10}$, which is fixed on the horizontal shaft, $D^{11}$, which rests in three bearings, $D^{12}$, on the upper arm, $A^1$. At its right hand end, the shaft, $D^{11}$, projects through the bearing, $D^{13}$, and there supports immovably a bevel gear wheel, $D^{14}$, which meshes with a bevel gear wheel, $D^{15}$, which is supported immovably on the upper end of an oblique shaft, $D^{16}$, resting in bearings, $D^{17}$. The lower end of the shaft, $D^{16}$, projects through the lower bearing, $D^{17}$, and is surrounded by a bevel gear, $D^{18}$, which is rigid on said shaft and meshes with a bevel gear, $D^{19}$, which is mounted rigidly on the upper end of an upright shaft, $D^{20}$, which rests in a bearing, $D^{21}$. The lower end of said shaft projects below the bearing, $D^{21}$, and is surrounded by a bevel gear wheel, $D^{22}$, which is rigid on said shaft and meshes with a bevel gear wheel, $D^{23}$, on the horizontal drive shaft, $B^3$, which has already been described as receiving motion from the worm shaft, $D^8$.

Figure 13:
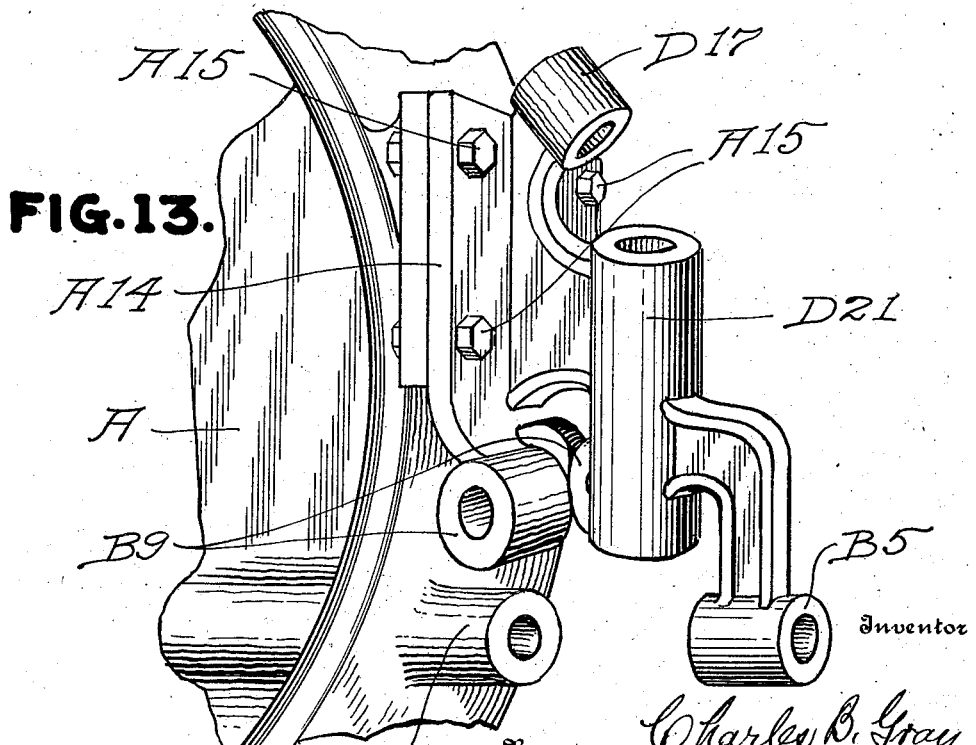
Fig. 13 is a perspective view showing a bracket casting.

The bearings, $D^{17}$, $D^{21}$, and the right hand bearing, $B^5$, are formed on the bracket piece, $A^{14}$, which is secured to the body, A, by bolts, $A^{15}$. Said bracket piece is shown in perspective in Fig. 13.

Between the left hand bearings, $D^{12}$, $D^{12}$, a yielding friction clutch, E, is placed on the shaft, $D^{11}$. Said shaft is cut transversely and at one side of said cut one member, $E^1$, of the clutch is secured rigidly to the shaft by means of a set bolt, $E^3$. At the other side of the cut, the other member, $E^2$, of the clutch surrounds the shaft and is feathered thereon to permit endwise movement on the shaft and to compel rotation with the shaft. At the right of said clutch member a coiled spring, $E^4$, surrounds the shaft and bears against said member and against a nut, $E^5$, threaded around said shaft. Thus said spring constantly yieldingly presses the clutch member, $E^2$, against the clutch member, $E^1$. The pressure of said spring may be varied by turning the screw, $E^5$, toward or from the clutch. Ordinarily during the cutting operation, the meeting portions of the edges of the two shearing wheels travel in unison. If tendency to change this relation during the turning of the turret to move the upper shearing wheel in its orbital path produces abnormal resistance to the rotation of the shaft, $D^6$, the members of the clutch, E, will slip over each other. It will be understood that the normal engagement between the two clutch members is sufficient to normally transmit the required power for positively rotating the upper shearing wheel.

From the foregoing it will be seen that power is transmitted to the lower shearing wheel through the shafts, $B^3$, and B, while power is transmitted to the upper shearing wheel through the shafts, $D^{20}$, $D^{16}$, $D^{11}$, $D^6$ and D. The direction of transmission through these two sets of shafts is such as to cause the meeting edges of the shearing wheels to move in the same direction.

From the foregoing description it will appear that the shaft, $D^6$, the worm wheel, $C^1$, the turret body, C, the lower shearing wheel, $B^{23}$, the shaft, B, and the screw shaft, $A^7$, are on a common upright axial line. It will also appear that the turret body and all the parts supported thereby may be turned in either direction by turning the hand wheel, $C^7$.

The barrel, $C^{14}$, is far enough from said axial line to bring the upper shearing wheel beside the lower shearing wheel, the edges of the knives merely touching in a common point.

Figures 11, 12:
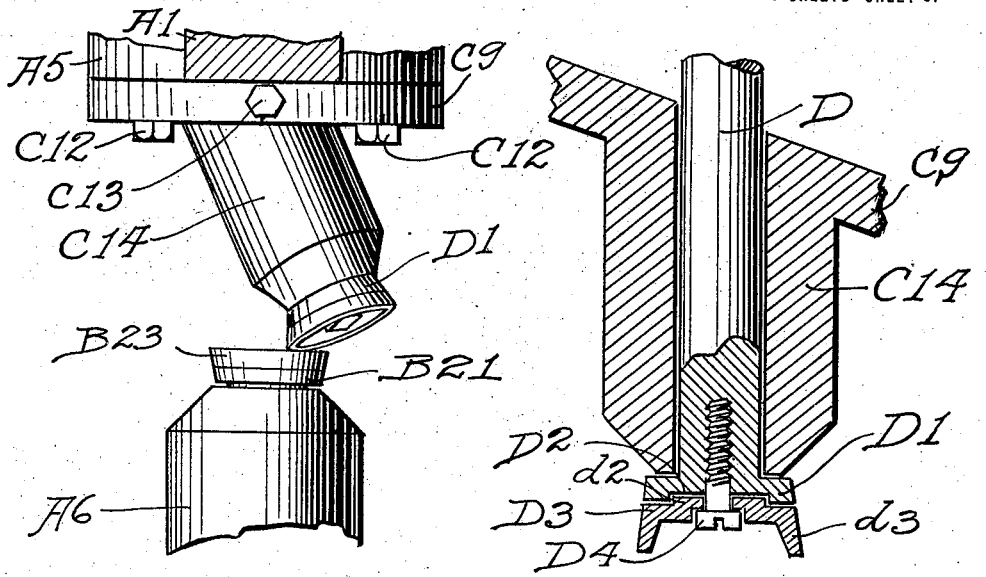
Fig. 11 is an elevation of the shearing wheels and their supports, looking toward the left between the arms of the machine body as shown in Fig. 1.
Fig. 12 is a section along the axis of the upper shearing wheels.

The axial line of the shaft, D, is in a plane which cuts diagonally the axial line of the turret body, whereby the upper shearing wheel becomes tilted, the portion which is the farther from the lower shearing wheel being the higher, and whereby the plane of the lower face of the upper shearing wheel obliquely cuts the plane of the lower shearing wheel. In this manner, the meeting edges of the shearing wheels are set into inter-engagement and position suitable for shearing. In this manner, an opening is presented for the introduction of a sheet of material to be cut. (See Fig. 11).

Since the lower shaft, B, and the turret body are on the same axial line, and since the edge of the lower shearing wheel is circular and concentric to said axial line and since the upper knife may be moved through an orbit which is concentric to said axial line, it follows that the above-described engagement between the two shearing wheels will be retained regardless of the position which the upper shearing wheel occupies in its orbital path.

The shearing wheels also serve as feed wheels for the sheet to be cut, both of said wheels being positive feed elements.

In operation, the turret is turned into position to bring the upper shearing wheel into the portion of its orbital path which will cause the two shearing wheels to make a cut in the desired direction. When, for example, the upper shearing wheel is set toward the right, as shown in Fig. 1, the cut will be on a line which is perpendicular to the upright plane of the arms, $A^1$ and $A^2$. If said upper wheel is placed at the opposite side of the lower shearing wheel, the cut will be on a line parallel to the line already mentioned, but the direction of the feed of the sheet will be reversed. By placing the upper wheel at the front or at the rear of the lower shearing wheel, the direction of the cut will be parallel to said plane and at right-angles to said lines. If the upper wheel is set intermediate any two of the four positions mentioned above, the direction of the cut will be diagonal to said plane and said two parallel lines. The direction of the cut is dependent upon the direction of the feed, and the direction of the feed changes with the change of position of the upper shearing wheel.

If a sheet of material which is to be cut is so long as to make it inconvenient to turn it in a horizontal plane on the cutting point to change the direction of the cut, the operator turns the hand wheel, $C^7$, to move the upper shearing wheel in its orbit in the appropriate direction and to the necessary extent. Then the feed of the sheet becomes changed accordingly. In many cases, it is convenient to turn the sheet through a limited range while the cutting is proceeding, but not convenient to make a considerable change in the direction of the feed. In such cases, the hand wheel may be turned for changing the general course of feed and the sheet may be turned for effecting limited additional variation in the direction of the feed.

In some cases, a sheet is longer than the throat space. Then the turning of the sheet is much limited. Yet the cut may be made in any desired direction by appropriately moving the upper shearing wheel in its orbit. In this manner small and large circles and curves of various forms may be cut. Angles may also be cut in any desired form.

The split nut, $A^{10}$, is to be so positioned on the screw shaft, $A^7$, as to make contact with the lower face of the arm, $A^2$, when the lower shearing wheel is at the proper elevation to make the desired inter-engagement between the two shearing wheels. The split nut is made adjustable on the screw shaft in order to provide for variation of the height of the lower shearing wheel when said nut makes contact with the arm, $A^2$. When a sheet of material which is to be cut is to be inserted for beginning cutting at some point within the body of the sheet, the hand wheel, $A^9$, is turned in the proper direction to move said shaft downward, whereby the lower shearing wheel is moved downward away from the upper shearing wheel. Then, after the sheet has been thus inserted, said hand wheel is to be turned in the opposite direction until the split nut again makes contact with the arm, $A^2$, whereby the lower shearing wheel is again lifted into its working position. In similar manner, the lower shearing wheel may be lowered for the removal of said sheet of material when the cutting is stopped within the body of the sheet. Thus the split nut serves as an adjustable stop for arresting the upward movement of the screw shaft when during its upward movement the lower shearing wheel reaches its working position.

By shifting the base plate, $C^9$, horizontally on the turret body, proper initial horizontal relation between the shearing wheels is established; and subsequently horizontal readjustment of the upper shearing wheel may be made to compensate for reduction of diameter of either or both of the wheels through regrinding, the grinding of each wheel being done on the periphery.

Regarding the peculiar position of the axis of rotation of the upper shearing wheel, it may be further stated that said axis is tangential and oblique to the periphery of an imaginary cylinder formed with its axis coincident to the axis of the lower shearing wheel.

As already indicated, the sheet to be cut is placed horizontally between the two shearing wheels and is maintained in that position during the shearing operation. The plane in which said sheet rests may be regarded as the sheet plane. It is to be observed that the upper face of the lower shearing wheel is presented flatwise to the shearing plane and that the other shearing wheel is located above said plane and has its edge meeting the edge of the lower shearing wheel in said plane.

I claim as my invention,

1. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, and driving means for rotating the second wheel on its rotation axis, substantially as described.

2. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, and driving means for simultaneously rotating said shearing wheels on their axes, substantially as described.

3. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, and yieldingly-engaged driving means for rotating the second wheel on its rotation axis, substantially as described.

4. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, and driving means for simultaneously rotating said shearing wheels on their axes, one of said driving means being in yielding engagement, substantially as described.

5. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, and driving means for simultaneously rotating said shearing wheels on their axes, the upper of said driving means being in yielding engagement, substantially as described.

6. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, manual means for rotating said supporting means, and driving means for rotating the second wheel on its rotation axis, substantially as described.

7. In a machine of the nature described, a pair of rotary shearing wheels having co-working edges, means supporting the first of said wheels for rotation on a relatively fixed axis, means for supporting the second of said wheels for revolution around an axial line co-incident with the axial line of the first wheel and for rotation on an axial line which is non-co-incident with the axial line of revolution, manually-operated gearing for rotating said supporting means, and driving means for rotating the second wheel on its rotation axis, substantially as described.

8. In a machine of the nature described, a pair of rotary shearing wheels having co-working edges, means supporting the first of said wheels for rotation on a relatively fixed axis, a turret on the axial line of said first wheel, a shaft supported by said turret and having its upper end extending into said axial line and having its lower end extending away from said line and supporting the second of said wheels, and a second shaft located on said axial line above and in engagement with the first-mentioned shaft, and driving means for rotating said second shaft, substantially as described.

9. In a machine of the nature described, a pair of rotary shearing wheels having co-working edges, means supporting the first of said wheels for rotation on a relatively fixed axis, a turret on the axial line of said first wheel, a shaft supported by said turret and having its upper end extending into said axial line and having its lower end extending away from said line and supporting the second of said wheels, and a second shaft located on said axial line above and in engagement with the first-mentioned shaft, and yieldingly-engaged driving means for rotating said second shaft, substantially as described.

10. In a machine of the nature described, a pair of rotary shearing wheels having co-working edges, means supporting the first of said wheels for rotation on a relatively fixed axis, a turret on the axial line of said first wheel, a shaft supported by said turret and having its upper end extending into said axial line and having its lower end extending away from said line and supporting the second of said wheels, and a second shaft located on said axial line above and in engagement with the first-mentioned shaft, driving means for rotating said second shaft, and manual means for turning said turret, substantially as described.

11. In a machine of the nature described, a pair of rotary shearing wheels having co-working edges, means supporting the first of said wheels for rotation on a relatively fixed axis, laterally adjustable means for supporting the second of said wheels for revolution around an axial line co-incident with the axial line of the first wheel and for rotation on an axial line which is non-co-incident with the axial line of revolution, and driving means for rotating the second wheel on its rotation axis, substantially as described.

In testimony whereof I have signed my name this 2nd day of October, in the year one thousand nine hundred and seventeen.

CHARLES B. GRAY.

Copies of this patent may be obtained for five cents each, by addressing the "Commissioner of Patents, Washington, D. C."